United States Patent

Jun

Patent Number: 6,020,903
Date of Patent: Feb. 1, 2000

[54] METHOD AND APPARATUS FOR USING VIDEO MEMORY AS SYSTEM MEMORY

[75] Inventor: Dae-Hyun Jun, Yongin, Rep. of Korea

[73] Assignee: SamSung Electronics Co., Ltd., Kyungki-do, Rep. of Korea

[21] Appl. No.: 08/935,139

[22] Filed: Sep. 22, 1997

[30] Foreign Application Priority Data

Sep. 20, 1996 [KR] Rep. of Korea ................ 96-41365

[51] Int. Cl.⁷ ................................. G06F 15/167
[52] U.S. Cl. .................... 345/512; 345/509; 345/203
[58] Field of Search .................. 345/507, 509, 345/515, 516, 508, 512, 203, 501; 395/651–653, 821–823, 828, 830; 711/147–153, 170–173; 713/1, 2, 100; 710/8–10

[56] References Cited

U.S. PATENT DOCUMENTS

| | | | |
|---|---|---|---|
| 5,187,792 | 2/1993 | Dayan et al. | 364/DIG. 1 |
| 5,261,104 | 11/1993 | Bertram et al. | 364/236.2 |
| 5,307,497 | 4/1994 | Feigenbaum et al. | 364/975.2 |
| 5,375,210 | 12/1994 | Monnes et al. | 710/10 |
| 5,396,597 | 3/1995 | Bodin et al. | 345/509 |
| 5,404,445 | 4/1995 | Matsumoto | 345/520 |
| 5,502,808 | 3/1996 | Goddard et al. | 345/501 |
| 5,659,715 | 8/1997 | Wu et al. | 711/170 |
| 5,664,139 | 9/1997 | Spurlock | 711/202 |
| 5,731,809 | 3/1998 | Lin et al. | 345/507 |
| 5,737,765 | 4/1998 | Shigeeda | 711/170 |
| 5,790,849 | 8/1998 | Crocker et al. | 345/512 |
| 5,854,637 | 12/1998 | Sturges | 345/512 |
| 5,854,638 | 12/1998 | Tung | 345/512 |
| 5,864,698 | 1/1999 | Krau et al. | 395/652 |

*Primary Examiner*—Ulka J. Chauhan
*Attorney, Agent, or Firm*—Robert E. Bushnell, Esq.

[57] ABSTRACT

A method for using a video memory as a system memory in a computer having a system bios, the system memory, and a video graphic adapter (VGA), includes the steps of examining the system memory using the system bios when the computer switched is on, and determining the size thereof, determining whether to use a portion of a video memory reserved for the VGA as the system memory after referring to an initializing means and connecting the portion of the video memory to the system memory to be defined as an entire system memory when the portion of the video memory is used as the system memory, determining the mode for using the portion of the video memory as the system memory and the mode for using the remaining portion of the video memory as video graphic display, and related register values, initializing the VGA, and jumping to the step of initializing the VGA if the portion of the video memory is not to be used as the system memory.

14 Claims, 2 Drawing Sheets

METHOD AND APPARATUS FOR USING VIDEO MEMORY AS SYSTEM MEMORY

CLAIM OF PRIORITY

This application makes reference to, incorporates the same herein, and claims all benefits accruing under 35 U.S.C §119 from an application entitled Method For Using Video Memory As System Memory earlier filed in the Korean Industrial Property Office on Sep. 20, 1996, and there duly assigned Serial No. 96-41365 by that Office.

BACKGROUND OF THE INVENTION

1. Field of the Invention

The present invention relates to a computer memory utilizing method, and more particularly, to a method and apparatus for using a superfluous memory portion of a memory provided on a video graphic adapter (VGA) board as a system memory.

2. Description of the Related Art

A general IBM personal computer (PC) has a memory map and an input/output (I/O) map. The memory map is divided into a system memory area and a video memory area. The video memory is mapped in the system memory. In a VGA, the area that the video memory is mapped in the system memory is limited to A0000h-BFFFFh. The video memory is a frame buffer for storing all the video data displayed on the screen of a monitor, and requires a memory capacity of one megabyte for the VGA in a 1024×768×256 color mode. Since the amount of memory occupied by the area A0000h-BFFFFh in the system memory is only 128 Kilobytes, the video memory cannot be mapped in the system memory all at one time. Therefore, the video memory is mapped over eight consecutive times in the area A0000h-BFFFFh of the system memory by selection of a map register enable bit and switching. In this method, the video memory can be extended to one megabyte, two megabytes, and four megabytes.

For a VGA in a 1024×768×16M color mode, however, the video memory of the VGA requires four megabytes. Since the mapped system memory occupies only the area A0000h-BFFFFh, a program for changing the VGA video memory map area and designation of related register values should be continuously operated, thus reducing the operation speed of a computer.

Furthermore, when a 1024×768×16M color mode is used in a VGA board having a four megabyte-video memory, for example, the four megabytes of memory are exclusively used as the VGA video memory. On the other hand, in a 800×600×56K color mode, the video memory uses only two megabytes and the remaining two megabytes are superfluous, thereby decreasing memory efficiency.

The reason for such decreased memory efficiency is that the system memory is separated from the VGA video memory, they are controlled by different controllers, and thus they cannot be extended to each other. As described above, in the art, the video memory provided for the VGA is reserved for its own use. Thus, when only a small portion of a given high capacity video memory is used, the superfluous memory portion remains useless, thereby decreasing memory use efficiency.

SUMMARY OF THE INVENTION

The object of the present invention is to provide an improved video memory and process for using the video memory.

It is another object to provide a process and apparatus for using a video memory as a system memory.

It is still another object to provide a process and a video memory able to augment the efficiency of memory use.

It is yet another object to provide a process and a video memory that more efficiently uses superfluous portion of a video memory designated for a video graphic adapter.

These and other objects may be achieved with the use of a video memory as a system memory in a computer having a system bios, the system memory, and a video graphic adapter (VGA), examining the system memory using the system bios when the computer is switched on, and determining the size of the system memory; determining whether to use a portion of a video memory reserved for the VGA as system memory after referring to an initializing means having a program therein to inform the VGA bios whether or not to configure a portion of the video memory as system memory, and connecting the portion of the video memory to the system memory to be defined as an total system memory when the portion of the video memory is used as system memory; determining the mode for using the portion of the video memory as system memory and the mode for using the remaining portion of the video memory as video graphic display, and related register values; initializing the VGA; and jumping to the step of initializing the VGA whenever a determination is made not to use a portion of the video memory as system memory.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 3:
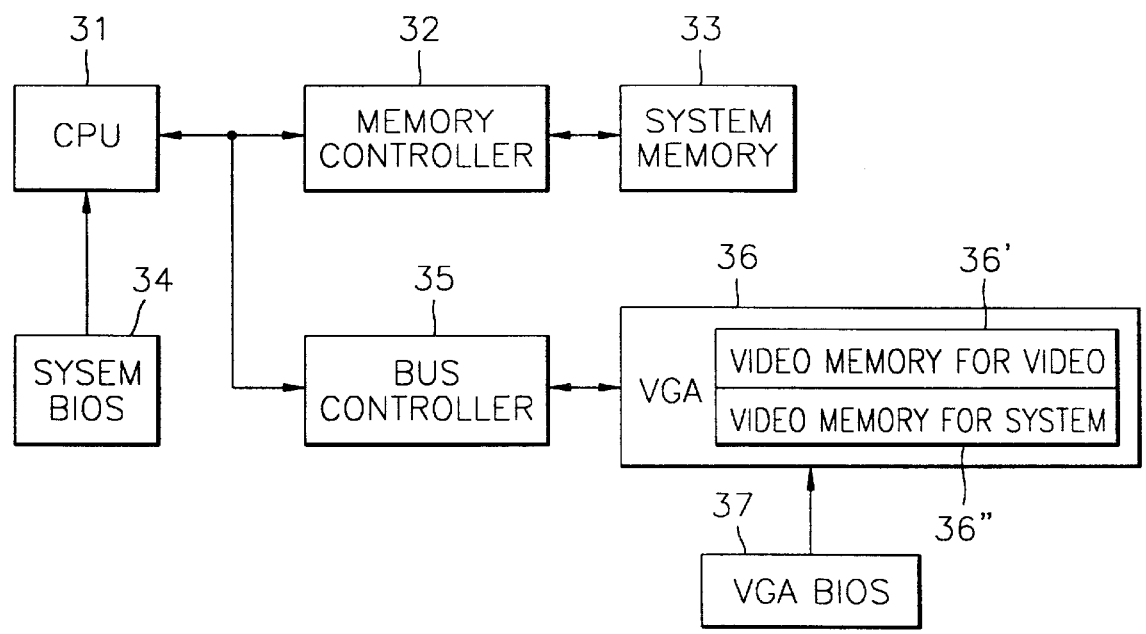
FIG. 3 is a schematic diagram of a system in which a portion of a video memory is used as additional system memory according to the principles of the present invention.

Referring initially to FIG. 3, the structure of a system in which a method for using a video memory as a system memory according to the present invention is adopted will be described. As shown, a system bios 34 and a memory controller 32 are connected to a central processing unit (CPU) 31. A system memory 33 is connected to memory controller 32, for performing read and write operations according to a signal from CPU 31. Memory controller 32 decodes a signal transmitted from CPU 31. A bus controller 35 is connected to CPU 31, memory controller 32, and a VGA 36. A VGA bios 37 is connected to VGA 36. A video memory for video 36' and a video memory for system 36" are provided in VGA 36.

Figure 1:
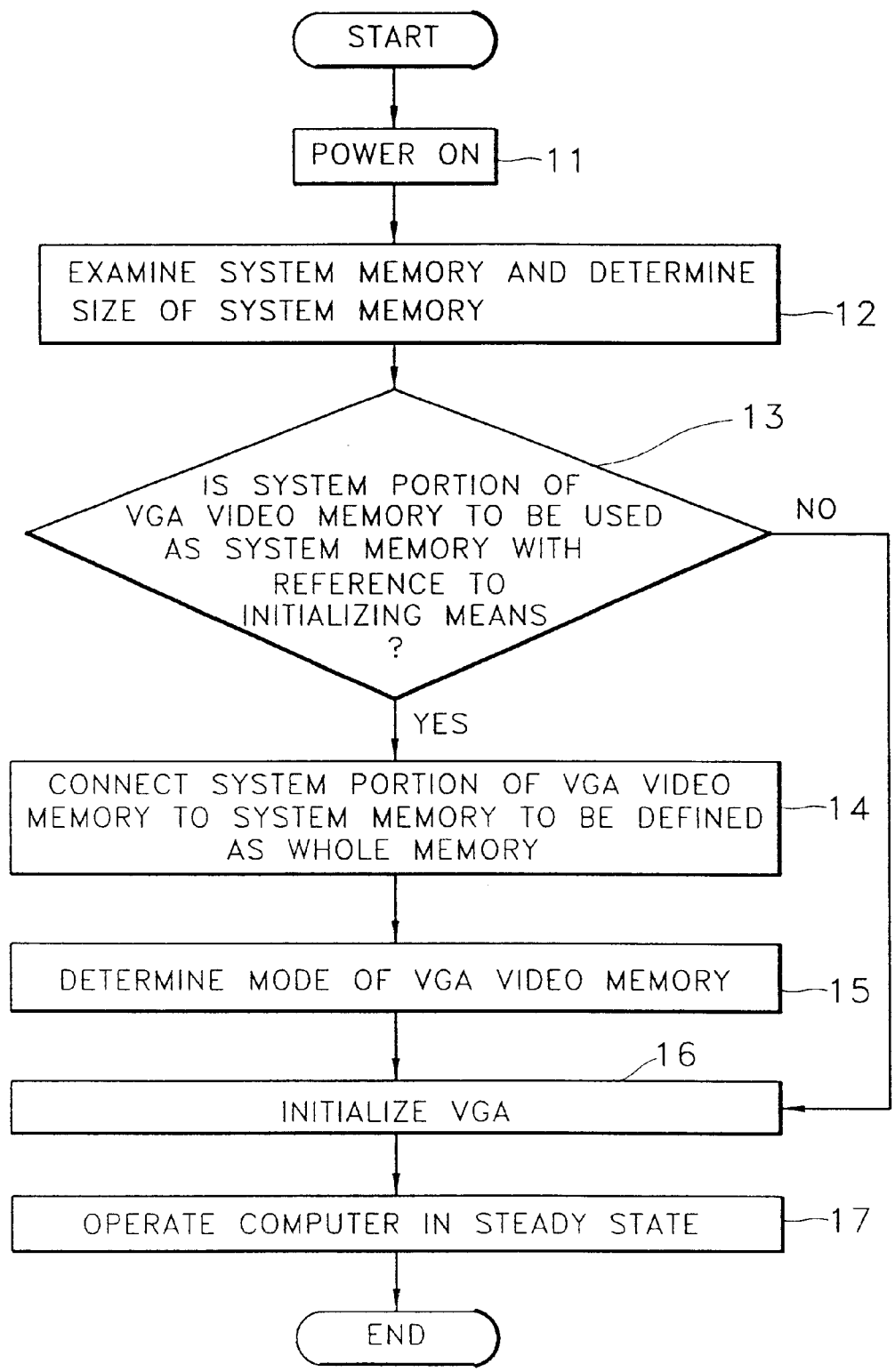
FIG. 1 is a flowchart showing a method for using a video memory as a system memory according to the principles of the present invention.

Referring now to FIGS. 1 and 3, the method for using a video memory as a system memory according to the present invention will be described.

When a computer is switched on in step 11, the system bios 34 examines and determines the size of system memory 33 in step 12.

Then, VGA bios 37 determines whether to use video memory for system 36" as system memory, referring to an initializing means such as an electrically erasable, programmable, read only memory (EEPROM) or an autoexec.bat file, in step 13. The initializing means (not shown) has a program therein to inform VGA bios 37 whether or not to configure a portion of the video memory as system memory. If video memory for system 36" is to be used as system memory, system memory 33 is connected to video memory for system 36" of VGA 36 which is mapped in the linear addressing area of FD000000h-FDFFFFFFh and thus defined as a whole or total system memory, in step 14. Here, system bios 34 examines system memory 33 and the linear addressing area and connects video memory for system 36" of VGA 36 to system memory 33. That is, VGA bios 37 controls the VGA 36.

Thereafter, in step 15, the entire VGA video memory including video memory for video 36' and video memory for system 36" is activated by VGA bios 37. Then, the mode of using video memory for system 36" of the VGA as system memory with system memory 33 and the mode, i.e. the resolution and number of colors, of displaying the remaining video memory i.e., video memory for video 36', on the screen of a monitor (not shown) are determined, and the values of related registers or VGA extended registers (not shown) are determined. Then, VGA 36 is initialized in step 16.

Meanwhile, if it is determined in step 13 that video memory for system 36" of VGA 36 is not used as system memory, the procedure jumps to step 16 for initializing VGA 36. When VGA 36 is initialized and the computer is operated in a steady state, step 17, and the program is then ended.

Figure 2:
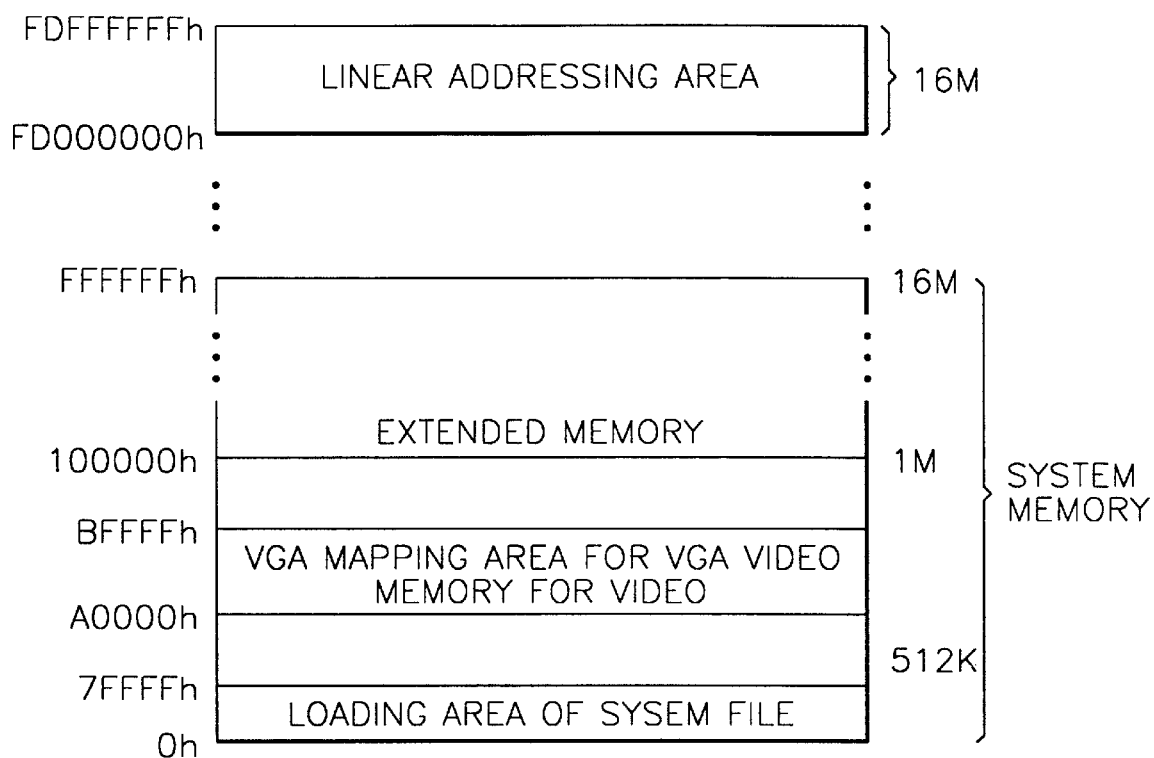
FIG. 2 is a memory map explaining the method for using a video memory as a system memory according to the principles of the present invention.

FIG. 2 is a memory map explaining the method for using a video memory as a system memory according to the present invention. The linear address area is a memory addressing scheme in which the whole memory of a system can be accessed using a single address that fits in a single register or instruction. FIG. 2 shows the conventional segmented memory architecture and the linear address area. The linear memory addressing scheme is used to significantly speed up the system, but the segmented memory architecture remains for compatibility with older software and hardware. The area A0000h-BFFFFh allocated in the segmented memory architecture for video information in the system memory is only 128 KB. However, 1MB of memory is required to display VGA graphics in a 1024×768 pixel, 256 color mode. Thus, video information must be mapped in the area A0000h BFFFFH of the system memory eight consecutive times by selection of a map register enable bit and switching, which slows down the system. The memory allocation of the system memory in the segmented memory architecture, and the 128KB area A0000h-BFFFFh is used for mapping VGA video information. In the practice of the present invention, a 4MB video memory may be available as the linear address area and the area FD000000h-FD1FFFFFh may be used to map VGA video information. FD000000h through FDFFFFFFh represent a 16MB address map recognized by the CPU as a memory. Thus, in the example of the present invention, 2BM (the video memory for system 36") of a 4MB VGA video memory 36 are addressed by the CPU as addresses FD200000h-FD3FFFFFh, as if it were part of the system memory.

The system memory used in this memory map is 16 megabytes, and a linear addressing area is 16 megabytes. The linear addressing scheme is used to significantly speed up the system. In the present invention, the 4MB video memory is available as the linear address area, and FD000000h through FDFFFFFFh represent a 16MB address map recognized by CPU 31 as a memory. Video memory for video 36' of VGA 36 is 2 megabytes and video memory for system 36" of VGA 36 is 2 megabytes. Thus, 4 megabytes in total are allocated as the VGA video memory. A 512 kilobyte area of 0h-7FFFFh is used for loading a system file in the system memory, a 128 kilobyte area of A0000h-BFFFFh is for mapping the VGA video memory therein. A 15 megabyte area of 100000h-FFFFFFh of the 16 megabyte system memory is used as an extended memory. The video memory for video is mapped in the addresses of FD000000h-FD1FFFFFh, and the video memory for system is mapped in the addresses of FD200000h-FD3FFFFFh (not shown). Of the thus-allocated video memory, the remaining VGA video memory except for the video memory for video can be used as system memory. In the above case, 18 megabytes is available for total system memory.

Therefore, the superfluous video memory of the VGA video memory can be used as the to system memory, thus increasing memory use efficiency.

In the method for using a video memory as a system memory according to the present invention, both the VGA video memories for video and system can be used exclusively as a video memory when the resolution of a monitor and the number of colors are significant, whereas the VGA video memory for system is additionally allocated to the system memory, thus extending the entire system memory and increasing memory use efficiency when the size of the system memory is more important than the monitor resolution and the number of colors.

As described above, the method for using a video memory as a system memory increases memory use efficiency and the entire efficiency of a system since, a superfluous portion of a video memory provided to a VGA is used as a system memory.

What is claimed is:

1. A method for using a portion of a video memory as system memory in a computer having a system bios, a system memory, and a video graphic adapter including said video memory, said method comprising the steps of:

examining said system memory using said system bios when said computer is switched on, and determining the size of said system memory;

determining whether to use said portion of said video memory as additional system memory after referring to an initializing means, and connecting said portion of said video memory to said system memory to define a total system memory when said portion of said video memory is used as said additional system memory;

determining a mode for using said portion of said video memory as said additional system memory and a mode for using a remaining portion of said video memory as video graphic display memory, and related register values;

initializing said video graphic adapter; and jumping from said step of determining whether to use said portion of said video memory as additional system memory to said step of initializing said video graphic adapter when it is determined not to use said portion of said video memory as additional system memory.

2. The method as set forth in claim 1, further comprising a step of mapping said portion of said video memory to a predetermined linear addressing area.

3. The method as set forth in claim 1, wherein said size of said system memory is 16 Megabytes, said portion of said video memory has a size of 2 Megabytes and said remaining portion of said video memory has a size of 2 Megabytes.

4. An apparatus for configuring a portion of a video memory as system memory in a computer, said apparatus comprising:

a system memory connected to a central processing unit via a memory controller;

a system bios for examining and determining a size of said system memory;

a video graphic adapter including said video memory, said video graphics adapter being connected to said memory controller and said central processing unit via a bus controller; and a video graphic adapter bios for determining whether to configure said portion of said video memory for use as additional system memory after referring to an initializing means having an initializing program for informing said video graphic adapter bios whether or not to configure said portion of said video memory for use as additional system memory when said computer is turned on.

5. The apparatus as set forth in claim 4, wherein said initializing means comprises an autoexec.bat file stored on a hard drive of said computer.

6. The apparatus as set forth in claim 4, wherein said initializing means comprises an EEPROM.

7. The apparatus as set forth in claim 4, wherein said size of said system memory is 16 Megabytes, said portion of said video memory has a size of 2 Megabytes and a remaining portion of said video memory has a size of 2 Megabytes.

8. The apparatus as set forth in claim 4, wherein said video memory has a video memory for video portion and a video memory for system portion, said video memory for system portion being said portion of said video memory used as said additional system memory.

9. The apparatus as set forth in claim 8, wherein said size of said system memory is 16 Megabytes, said video memory for video portion has a size of 2 Megabytes and said video memory for system portion has a size of 2 Megabytes.

10. The apparatus as set forth in claim 9, wherein said video memory for video portion is mapped to an address area of FD000000h-FD1FFFFFh of a predetermined linear addressing area, and said video memory for system portion is mapped to an address area FD200000h-FD3FFFFFh of said predetermined linear address area.

11. The apparatus as set forth in claim 10, wherein said predetermined linear address area has an address range of FD000000h-FDFFFFFFh.

12. A method for using a portion of a video memory as system memory in a computer having a system bios, a system memory, and a video graphic adapter including said video memory, said method comprising the steps of:

examining said system memory using said system bios when said computer is switched on, and determining the size of system memory;

determining whether to use said portion of said video memory as additional system memory according to an autoexec.bat file;

connecting said portion of said video memory to said system memory when said autoexec.bat file indicates that said portion of said video memory is to be used as said additional system memory;

initializing said video graphic adapter; and jumping from said step of determining whether to use said portion of said video memory as additional system memory to said step of initializing said video graphic adapter when said autoexec.bat file does not indicate that said portion of said video memory be used as additional system memory.

13. The method as set forth in claim 12, further comprising a step of mapping said portion of said video memory to a predetermined linear addressing area.

14. The method as set forth in claim 12, further comprising a step of determining a mode for using said portion of said video memory as said additional system memory and a mode for using a remaining portion of said video memory as video graphic display memory.

* * * * *